Jan. 18, 1938. F. O. CHURCH 2,105,997
BACK CUSHION
Filed April 25, 1936 2 Sheets-Sheet 2
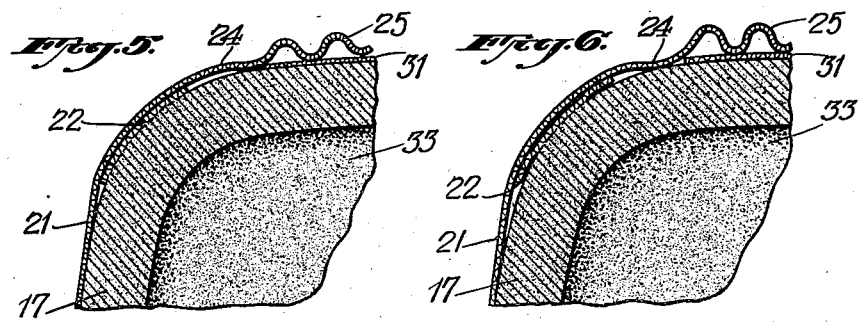
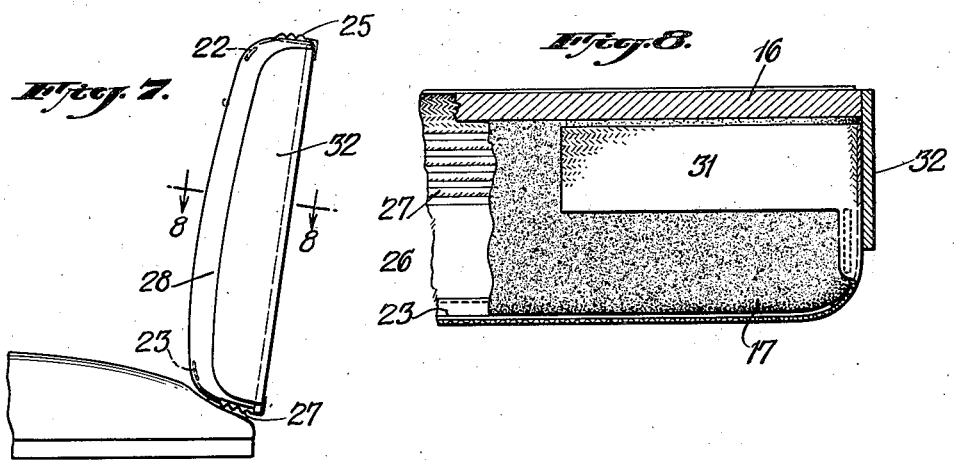
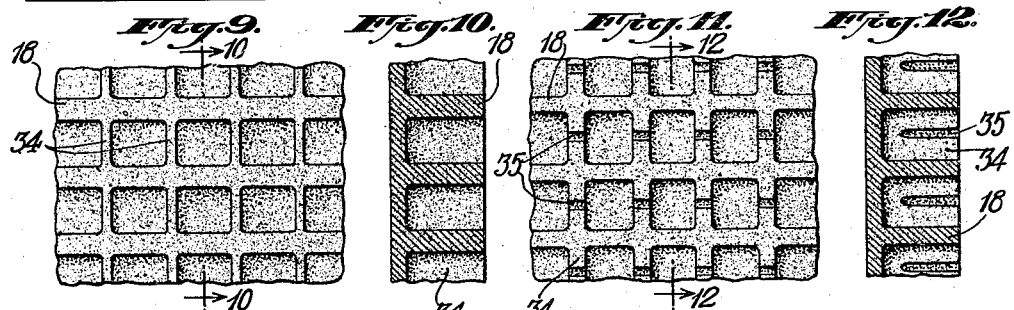
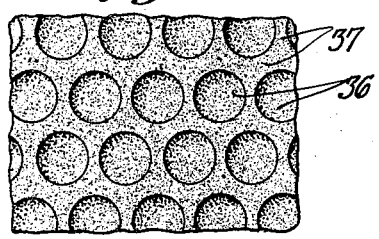
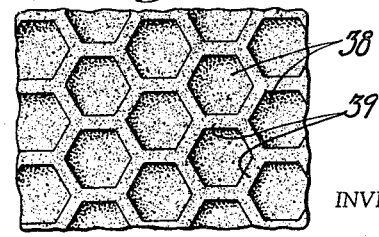
INVENTOR.
BY FRANKLIN O. CHURCH.
ATTORNEYS Patented Jan. 18, 1938

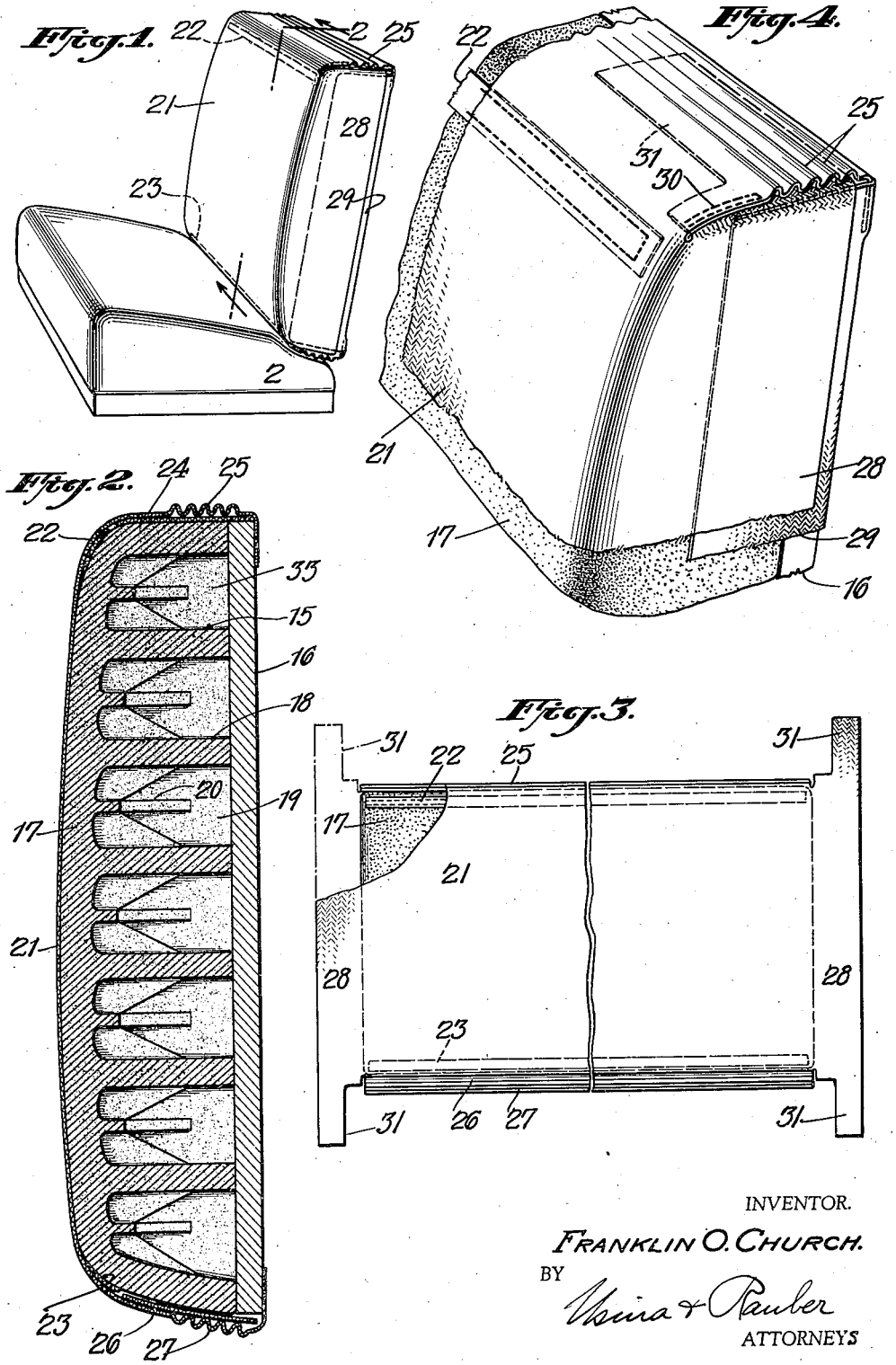

2,105,997

UNITED STATES PATENT OFFICE 2,105,997

BACK CUSHION

Franklin O. Church, Buffalo, N. Y., assignor to Dunlop Tire and Rubber Corporation, Buffalo, N. Y., a corporation of New York Application April 25, 1936, Serial No. 76,309

4 Claims. (Cl. 155—179)

My invention relates to back cushions or upholstery particularly suitable for motor vehicles such as automobiles, trucks, aircraft, etc.

Heretofore cushions or upholstery for the backs of vehicle seats have been constructed of a cushioning element mounted on a base or rigid back rest or frame and a covering material tightly drawn or stretched from one edge of the base or frame over the cushion to the opposite edge. This construction enables the cushioning element to yield under a backward pressure. But when the vehicle is in motion and subjected to the vibration or jarring incident to its motion, particularly over rough or uneven roads, the cushioning element and cover move up and down as a unit. The front area of the cover and of the cushioning element therefore moves up and down with an amplitude and rate of movement depending upon the type of vehicle, roughness of the road and speed of the vehicle.

This movement of the back rest or cushion is very fatiguing to a rider. If the back cushion is covered with a smooth material such as leather or imitation leather, slippage may occur between the rider and the cushion. Among other disadvantageous features, this wears or impairs the fabric of the clothing of the rider. When the back cushion is covered with a fabric such as mohair or broadcloth there is a stronger tendency to pull the rider up and down with the movement of the back rest and cushion and to exert a pulling tendency on the clothing of the rider.

In my present invention these disadvantages and defects are substantially avoided or eliminated, and a back cushion or upholstery is provided in which the front area or cover is free to move to a limited extent relative to the base or frame so that it may remain substantially stationary in contact with the back of the rider during the vertical vibrations or movement of the base.

The various features of the invention are illustrated by way of example in the accompanying drawings, in which:

Fig. 1 is a perspective view of a seat having a back cushion embodying a form of my invention.

Fig. 2 is a section of the back cushion taken on the plane 2—2 of Fig. 1.

Fig. 3 is a front view of the cushion, a portion being broken away to show certain features of the interior construction.

Fig. 4 is a perspective view of an upper part of the cushion of Figs. 1, 2 and 3.

Figs. 5 and 6 are part vertical sections showing details of construction.

Fig. 7 is a side view of a modified form of cushion.

Fig. 8 is a section on line 8—8 of Fig. 7.

Figs. 9 and 11 are face or vertical views.

Figs. 10 and 12 are corresponding vertical sections of a cushioning element particularly suited for use in my invention.

Figs. 13 and 14 are vertical or face views of still further modifications of the cushioning element.

In my invention I mount a cushioning element on a rigid base or frame. That side of the cushioning element that is attached to the base moves vertically upwardly and downwardly with it. The opposite side or face of the cushioning element, whether this element be formed of coil springs, of sponge or foamed latex rubber, or other construction, will have a loose or floating relation to the part attached to the base. A cover is applied and the front face or area of this cover is so attached to the cushioning element that it will move with the front face of the latter. The covering of the cushioning element is completed by providing sides or top areas or continuations of the front area which connect the front part of the cover to the base. The top and bottom portions of the cover are, however, not drawn tightly between the front area and the base but are sufficiently loose so as to permit the area of the cover overlying the front surface of the cushioning element to move upwardly and downwardly relative to the base.

The sides of the cover are stitched or joined to the sides of the top panel or portion for only a part of the distance back from the front surface so that there is an area between the stitched portion and the base that will permit free distortion between the base and the front portions. The side part of the cover is, however, extended inwardly to underlap the top portion to in this way prevent an open gap or seam, while permitting freedom of relative motion. The side is also preferably not attached directly to the base, but overlaps the cover element attached to the base.

The cushioning element may be of any suitable construction or material as, for example, the usual spring and padding, or of cellular rubber such as sponge rubber or foamed latex rubber. The latter type of cushioning is particularly suitable because it can be made with a front layer of limited thickness and an underlying mass between the front layer and the base which may be recessed inwardly from the base to provide horizontal and vertical partitions. As the material is flexible and resilient, these partitions freely bend or sway with the relative movements of the base and the front of the cushioning element. The thickness of the vertical and horizontal partitions, or other configuration, may be so arranged as to provide a minimum resistance to the relative vertical movement of the base and front part of the partitioning element for a given resilience or stiffness of cushion.

Referring more particularly to the accompanying drawings, the invention is illustrated in Figs. 1 to 4 inclusive, in connection with a cushioning element 15 of foamed latex rubber mounted on a rigid back base or frame 16 which extends in a vertical or upwardly inclined position. The cushioning element 15 may be of any suitable material such as natural latex rubber or a cellular structure of artificial rubber or similar plastic composition. It has a front wall 17 and a number of horizontal walls 18 integral with the front wall 17 and extending backwardly to the supporting base 16. Similar vertical walls are provided so as to form pockets 19 extending forwardly from the supporting base 16 into the mass of cellular rubber. These walls may be braced by bracing elements indicated at 20.

With the above construction, if the supporting base 16 is given a vertical vibration or jarring movement, the partitions extending backwardly from the front wall 17 sway or bend freely, thus enabling the front wall 17 to remain substantially stationary and to be subjected to a substantially negligible vibrational or jarring force.

The cushioning element 15 is provided with a cover having a front portion or area 21 overlying the front expanse of the wall 17 and secured to the cushioning element at or near the upper and lower parts of the wall 17. It may be secured to the cushioning element by any suitable means, depending upon the type and construction of cushioning element as, for example, by stitching or sewing it directly or through a connecting flap to the usual covering of a spring type cushioning element.

In the case of the foamed latex rubber, the front portion of the cover may be attached to the cushioning element by stitching flaps 22 and 23 of rubberized material to the upper and lower areas of the front part of the cover and cementing these flaps to the cushioning element. Thus the front area 21 of the cover will float with the front wall 17 of the cushioning element independently of the vibration or movement of the supporting base 16. The cover element is extended over the upper edge of the cushioning element to the base 16 as at 24, and is provided with a loose area, shown somewhat exaggerated at 25, to freely permit without tensioning the relative movement of this part of the cover. Similarly, the lower edge of the front area 21 is extended at 26 and 27 to the base 16 and secured in place.

The cover 21 is also extended over the sides of the cushioning element as at 28. To preserve the floating feature, the side extensions 28 of the cover are not secured directly to the base 16, but overlap a cover element 29 secured to the base and extending forwardly to underlap the rear edge of the extensions 28. This provides a freedom of movement between the side extensions or areas 28 and the base 16 while providing a closure between these two elements. The side extensions 28 and upper and lower extensions 26 are stitched together for a distance extending backwardly from the front area 21 as at 30. The remaining distance to the base or back support 16 is left unstitched, and the side extensions 28 are extended over the upper surface or edge of the cushioning element as at 31 so as to form an effective closure. They may be lightly secured between the cushioning element and the upper cover area 25 so as to prevent them from being pulled out of position. The lower edges of the side extensions 28 are similarly secured or overlap the bottom extensions 26 and 27. This construction enables a relative distortion of the cover fabric between the top and side extensions without putting any stress on the fabric or on the seams between the upper and side portions that would restrain the movement or cause a wear or weakening of the fabric.

Instead of providing a cloth underlying flap 29, a rigid extension 32 of metal or other material (Fig. 8) may be provided to extend forwardly from each edge of the base and overlap or cover the free edge of the side extensions 28. The metal extension 32 will not be secured to the extensions 28, but the extensions 28 will be held between the extension 32 and the side edge of the cushioning element.

The action of the cushion and cover is illustrated in Fig. 5 in which the front area 21 is held flush while the relative movement between the top extension 24 and the cushioning element may take place.

The invention may be applied to various types of cushioning element. A cushioning element formed of porous resilient material such as foamed latex rubber and having recesses 33 formed between the partition walls 18, as shown in Fig. 2, is particularly suited to the invention, however, as it permits a maximum freedom of flexing in a vertical direction between the front slab 17 and the supporting base 16. The horizontal partitions are generally separated and supported by vertical partitions. The partitions are preferably so arranged that the stiffness or rigidity of the vertical partitions is less than that of the horizontal partitions so that they will yield freely to vertical distortion. This may be accomplished in a number of different ways. As shown in Figs. 9 and 10, it may be accomplished by providing horizontal partitions 18 and vertical partitions 34 of less thickness than the horizontal partitions. In the modification shown in Fig. 11 the horizontal and vertical partitions are of substantially equal thickness, but the vertical partitions are slit, as at 35, to decrease their resistance to vertical distortion.

In case a cushion having cylindrical recesses is used a similar effect may be obtained by spacing the recesses more closely in the horizontal lines than in the vertical direction so as to provide relatively thin vertical walls 36 and thicker horizontal walls 37.

In the modification shown in Fig. 14 in which hexagonal recesses are employed, two parallel walls between adjacent recesses as, for example, the walls 38 are horizontal and the other walls 39 extend at an angle of 60° to the horizontal, which enables them to yield more readily in a vertical direction.

Through the above invention, the resiliency of the cushion is maintained against pressure applied to the surface of the cushion. The outer surface of the cushioning element and of the covering is, however, given a floating relation to the supporting base so that vertical movement, vibration and jarring of the base are absorbed in the cushion and not transmitted to the surface or surface covering and are thus not transmitted to the rider or occupant of the cushion.

What I claim is—

1. A back cushion for vehicles having a base, a cushioning element mounted on said base composed of cellular resilient material and having recesses projecting forwardly from said base to provide a front slab and intersecting walls between said front slab and said base, a cover secured to said cushioning element in fixed position on the front area of said cushioning element and extending over the sides of said cushioning element towards said base and being freely movable in a vertical direction relatively to said base, said intersecting walls having less resistance to vertical movement than to sidewise movement.

2. A back cushion for vehicles having a base, a cushioning element mounted on said base composed of cellular resilient material and having recesses projecting forwardly from said base to provide a front slab and intersecting walls between said front slab and said base, a cover secured to said cushioning element in fixed position on the front area of said cushioning element and extending over the sides of said cushioning element towards said base and being freely movable in a vertical direction relatively to said base, said intersecting walls having a hexagonal honeycomb arrangement with two walls of each hexagon arranged substantially horizontally.

3. A back cushion for vehicles having a base, a cushioning element mounted on said base composed of cellular resilient material and having recesses projecting forwardly from said base to provide a front slab and intersecting walls between said front slab and said base, a cover secured to said cushioning element in fixed position on the front area of said cushioning element and extending over the sides of said cushioning element towards said base and being freely movable in a vertical direction relatively to said base, certain of said intersecting walls being horizontal and others being vertical, said vertical walls being thinner than said horizontal walls.

4. A back cushion for vehicles having a base, a cushioning element mounted on said base composed of cellular resilient material and having recesses projecting forwardly from said base to provide a front slab and intersecting walls between said front slab and said base, a cover secured to said cushioning element in fixed position on the front area of said cushioning element and extending over the sides of said cushioning element towards said base and being freely movable in a vertical direction relatively to said base, some of said intersecting walls being horizontal and others being vertical, said vertical walls having slots to decrease their resistance to vertical distortion.

FRANKLIN O. CHURCH.